Nov. 25, 1969  A. C. McADAMS  3,480,163
STEERING ARM FOR BALE THROWER
Filed Feb. 23, 1968  3 Sheets-Sheet 1
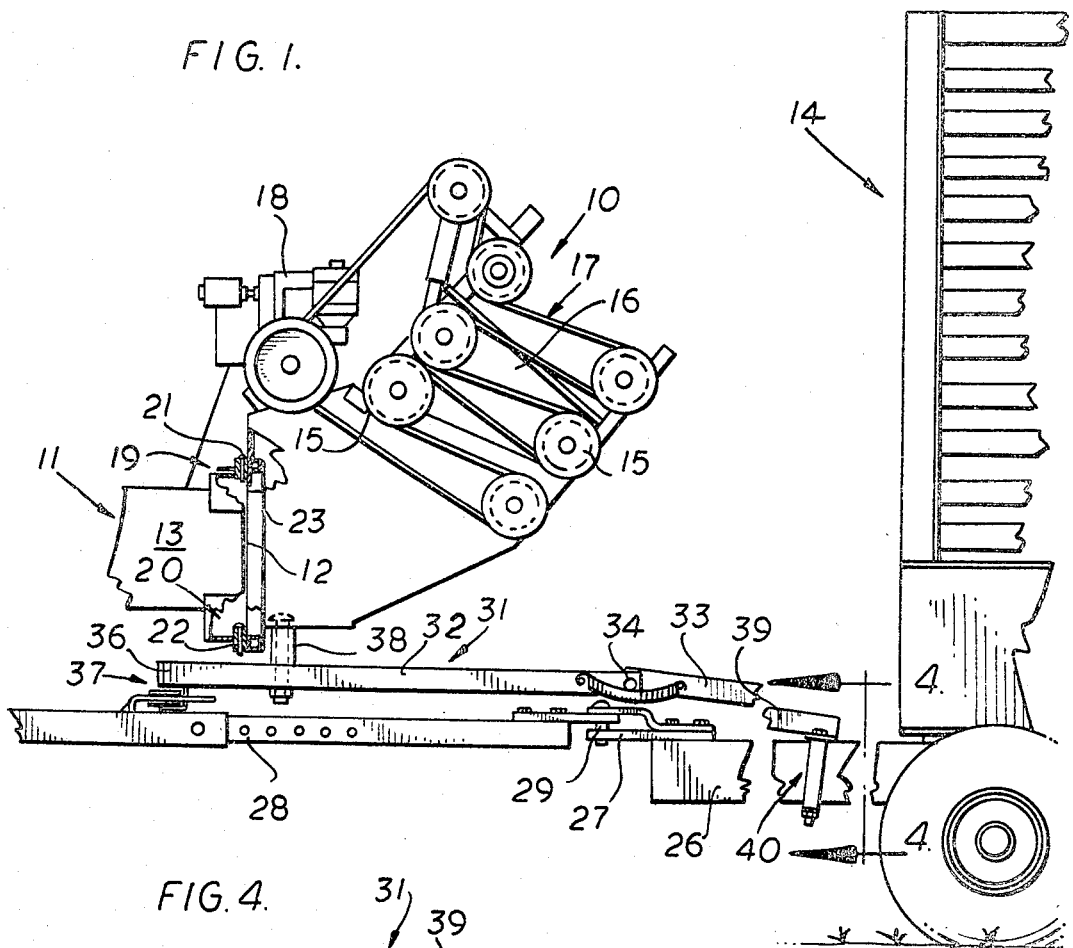
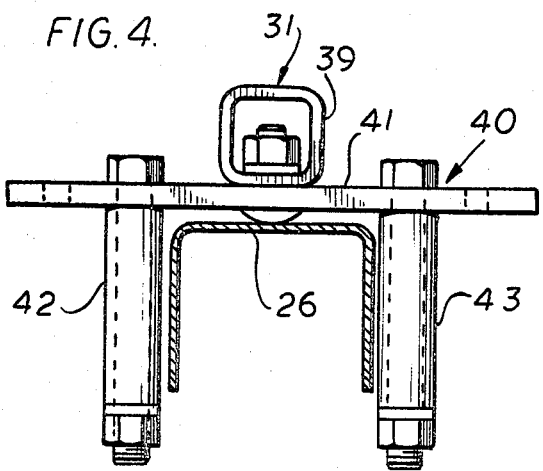
INVENTOR
ALLAN C. MC ADAMS
Robert L. Graham
ATT'Y Nov. 25, 1969    A. C. McADAMS    3,480,163

STEERING ARM FOR BALE THROWER

Filed Feb. 23, 1968    3 Sheets-Sheet 2

INVENTOR
ALLAN C. MC ADAMS
ATT'Y

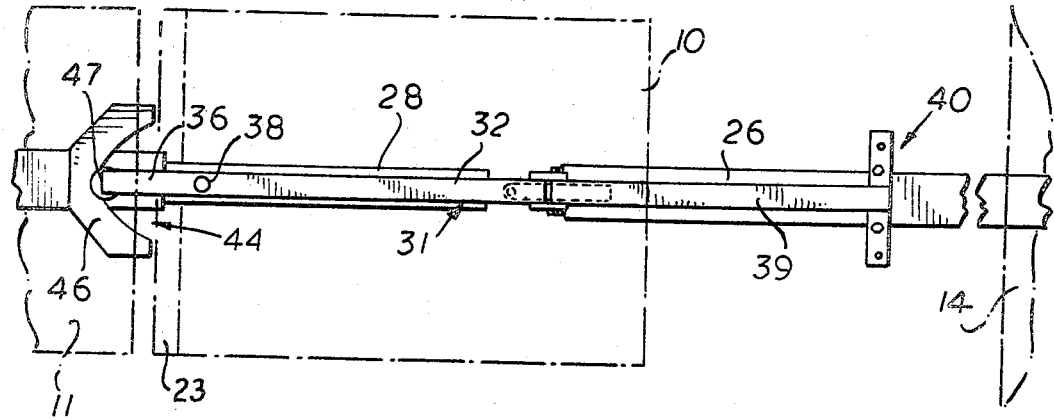
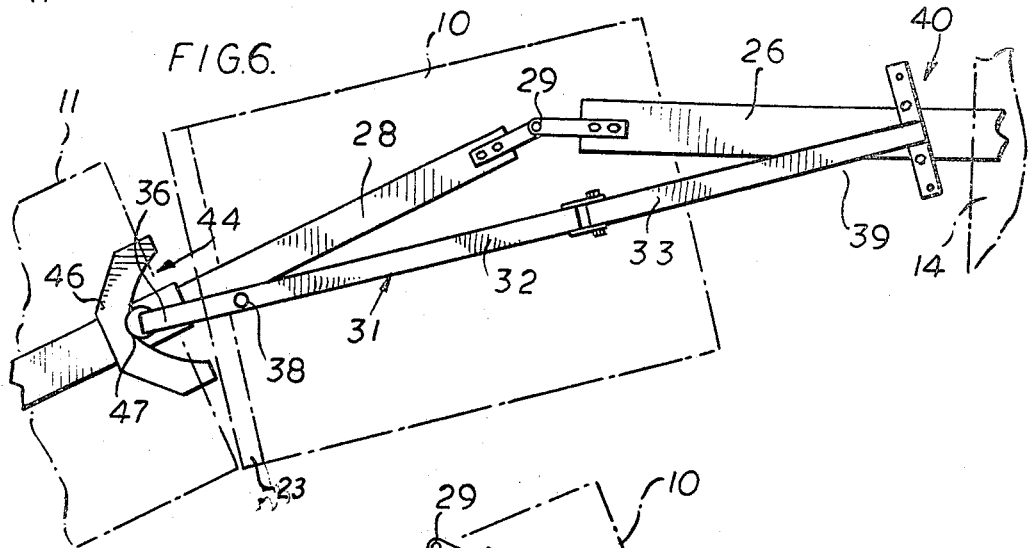
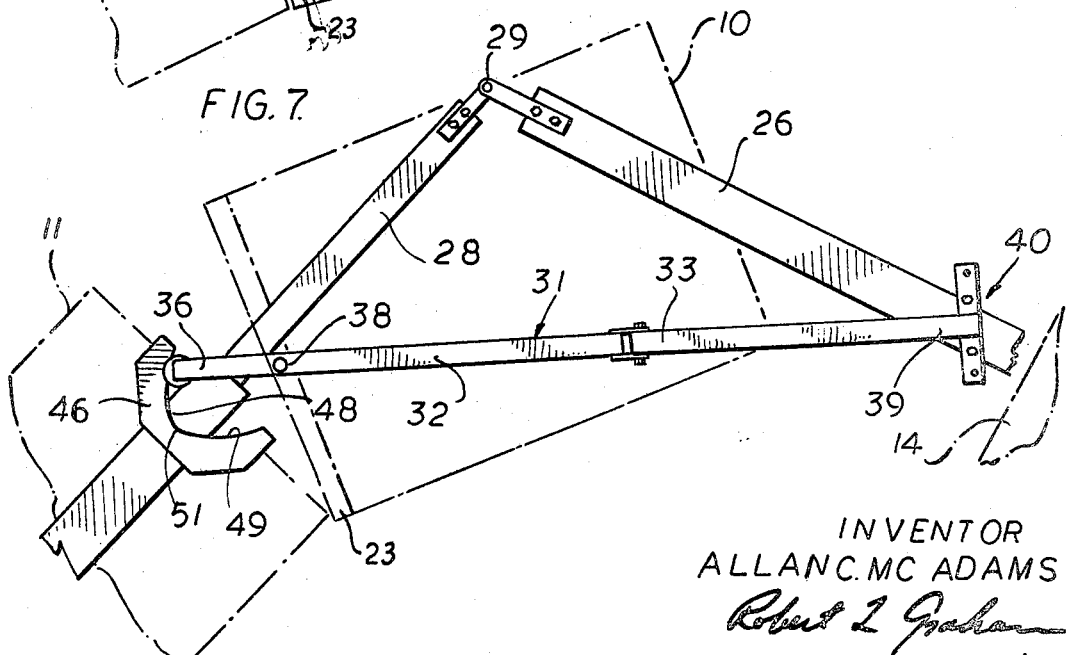

United States Patent Office 3,480,163
Patented Nov. 25, 1969

3,480,163
STEERING ARM FOR BALE THROWER
Allan C. McAdams, Memphis, Tenn., assignor to International Harvester Company, Chicago, Ill., a corporation of Delaware
Filed Feb. 23, 1968, Ser. No. 707,765
Int. Cl. B65g 67/04
U.S. Cl. 214—42                                  9 Claims

ABSTRACT OF THE DISCLOSURE

A steering arm for controlling the discharge direction of a bale thrower mounted at the rear of a baler and operably responsive to relative angular misalignment of the baler and an associated wagon. The steering arm interconnects the tongue of the wagon, the baler, and the bale thrower, all of which are relatively movable with respect to one another. The steering arm comprises a longitudinally extending member having a rearward end engageable with the tongue for detecting misalignment and a forward end pivotally attached to the baler and bale thrower at longitudinally spaced points.

BACKGROUND AND SUMMARY OF THE INVENTION

This invention relates generally to bale throwers and more specifically to steering arms for use with such bale throwers.

The bale thrower represents an effort in the bale handling art to provide a mechanism for mechanically accumulating bales discharged from the conventional field pickup baler. The typical bale thrower is mounted at the rear of a baler and functions to receive and toss bales into a trailing wagon towed behind the baler.

The means for mounting the bale thrower on the baler includes pivotal connections so that the bale thrower is laterally swingable. The lateral extent or the angular displacement on either side of the normal throwing direction defines the throwing scope of the bale thrower. The throwing scope of the bale thrower is limited in part to the angular turn which the bale emerging from the bale chamber and entering the bale thrower can make. This angle is generally in the range of 20 to 30 degrees on either side of the normal. A steering arm interconnects the bale thrower and the wagon and serves to maintain the proper alignment of the bale thrower in relation to the trailing wagon. The steering arm generally is attached to the wagon tongue and functions to sense misalignment of the wagon and the baler, such as occurs when the tandemly aligned equipment makes turns.

In negotiating sharp turns it frequently occurs that the trailing wagon is outside the throwing scope of the bale thrower. In this situation the bale thrower occupies one of the extreme lateral positions and the steering arm in maintaining the connection between the thrower and wagon absorbs that portion of angular displacement of the wagon outside throwing scope.

The purpose of this invention is to provide a steering arm operable to control the direction of the bale thrower and capable of moving relative to the bale thrower when the wagon is outside the throwing scope of the bale thrower.

To attain this end, this invention contemplates a steering arm pivotable about one axis fixed to the baler and guidingly connected to the bale thrower when the wagon is within the throwing scope, and pivotable about an axis on the bale thrower when the wagon is outside the throwing scope of the bale thrower.

DESCRIPTION OF THE DRAWINGS

FIGURE 1 is a side elevational view illustrating the bale thrower and the steering arm and their relationship with the baler and the trailing wagon;
FIGURE 4 is a sectional view of the steering arm and taken generally along line 4—4 of FIGURE 1;
FIGURE 5 is a plan view showing the steering arm, the hitch and the wagon tongue in relation to the baler, bale thrower and wagon which are drawn in phantom;
FIGURE 6 is a view similar to FIGURE 5 illustrating the relationship of the bale thrower and steering arm with the wagon angularly displaced from the direction of movement of the baler but within the throwing scope of the bale thrower;
and
FIGURE 7 is a view similar to FIGURES 5 and 6 showing the relationship of the bale thrower and the steering arm with the trailing wagon outside the throwing scope of the bale thrower.

DESCRIPTION OF THE PREFERRED EMBODIMENT

Figure 2:
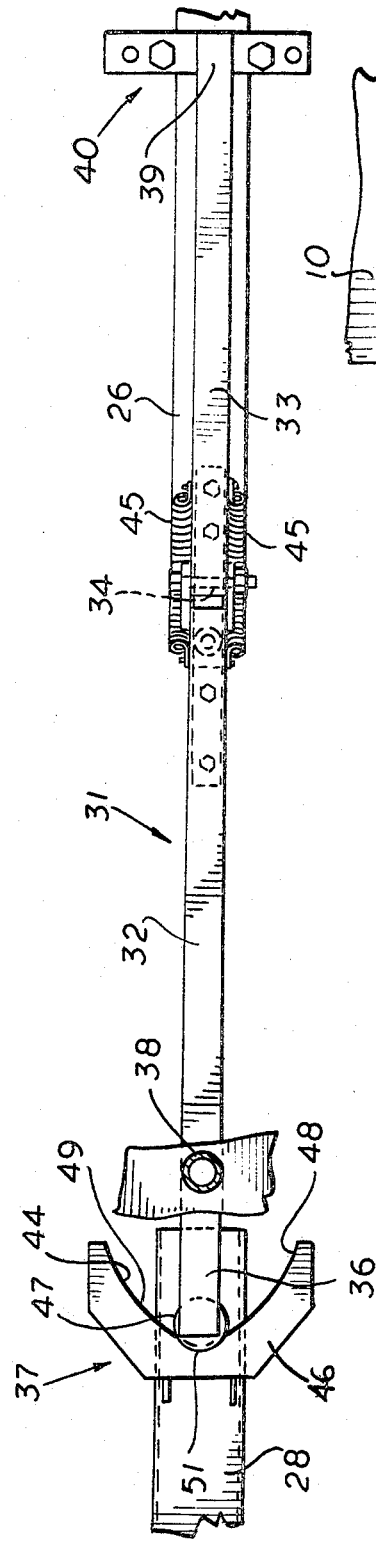
FIGURE 2 is an enlarged plan view of the steering arm shown detached from the bale thrower.

With reference to FIGURE 1 a bale thrower 10 is seen mounted at the rear of a baler 11 and aligned to receive bale discharged through an opening 12 of the bale chamber 13. Briefly, the bale thrower functions to receive a bale discharged through the opening 12 and to apply trajectory forces thereto thereby impelling the bale to a trailing wagon 14. In this particular embodiment, the means for applying trajectory forces include a plurality of upper and lower rollers designated as 15 and driven by a serpentine belt drive shown generally as 17. The power is supplied by an engine 18 mounted on the bale thrower 10. The upper and lower rollers 15 define an inclined and rearwardly opening bale passage 16. The general direction of the passage 16 determines the direction of flight of the bale.

The bale thrower 10 is mounted for pivotal movement about a vertical axis which passes through a mid-section of the bale chamber 13. Upper and lower mounting assemblies 19 and 20 include axially spaced and aligned pivot pins 21 and 22, respectively. A rectangularly shaped ring 23 which encircles the entrance to the bale passage 16 provides the means for mounting the bale thrower 10 to the upper and lower mounting assemblies 19 and 20, and serves to restrict the lateral swinging movement of the bale thrower 10. As indicated in FIGURES 6 and 7 the ring 23 abuts the outer side of the bale chamber 13 with the bale thrower 10 in either of its lateral extreme positions. Limiting the lateral swingability of the bale thrower 10 provides for a gradual change in direction for the bale emerging from the bale chamber 13 and thereby avoids undue deformation to the bale.

The trailing wagon 14 includes a tongue 26 which carries at its forward end a clevis 27. The clevis 27 is pinned to a baler hitch 28 as shown at 29, which in turn is secured to the baler 11 in a conventional manner (not shown). As shown in FIGURES 1 and 5 the hitch passes generally underneath the bale chamber 13 and lies in the same vertical plane as the pivotal axis of the bale thrower 10. A steering arm 31 interconnects the bale thrower 10 and the wagon 14 and serves to control the throwing direction of the bale thrower 10 in response to movement of the wagon 14 relative to the baler 11.

Referring specifically to FIGURES 1 and 2, the steering arm 31 comprises two separate arms 32 and 33 arranged in end-to-end relation and having their adjacent ends interconnected by pin 34. The arm 32 has a forward end 36 connected to the hitch 28 by means of an assembly designated generally as 37. An intermediate section of arm 32 is pinned to the underside of the bale thrower 10 as shown at 38. Arm 33 has a rearwardly disposed end 39 which carries a saddle member 40.

As shown in detail in FIGURE 4 the saddle member 40 includes a horizontal bar 41 and a pair of depending pins 42 and 43. The bar 41 slidingly engages the top surface of the tongue 26 at a point rearwardly spaced from the clevis 27, and the depending pins 42 and 43 flank opposite sides of the tongue 26. Now, as the baler 11 begins to change direction of travel causing misalignment of the baler 11 and wagon 14, the pins 42 and 43 detect the misalignment creating a reaction force which acting through the steering arm 31 causes the bale thrower 10 to swing laterally with respect to the baler 11 and thereby maintaining the alignment of the bale thrower 10 with respect to the wagon 14. Tension springs 45, 45 acting on opposite sides of the pin 34 maintains the saddle 40 in constant engagement with the tongue 26.

Figure 3:
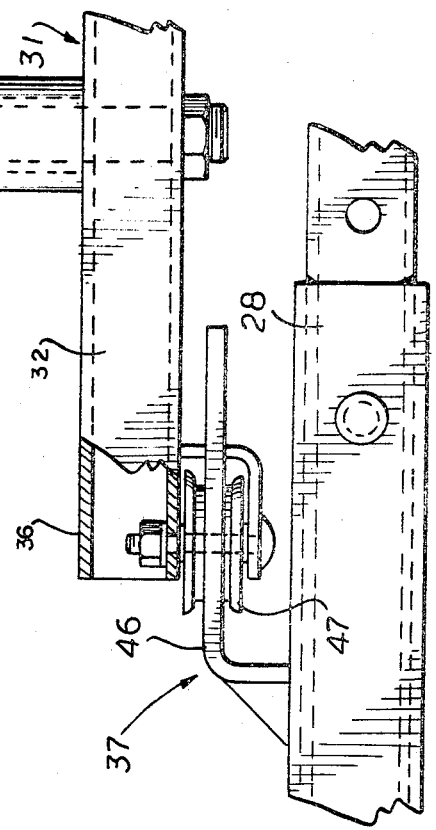
FIGURE 3 is an enlarged fragmentary elevational view of the forward end of the steering arm.

As shown in FIGURES 2 and 3, the mounting assembly 37 provides the joint function of serving as a pivot point for the steering arm 31 and permitting lateral movement of the end 36 of arm 32. The assembly 37 includes two interacting parts: a bracket 46 affixed to the hitch 28 and a roller 47 journaled to the forward end 36 of member 32. The bracket 46 has formed therein a cammed surface 44 which cooperates with the roller 47 to constrain the lateral movement of end 36. The surface 44 is particularly configured in the form of two intersecting arcs 48 and 49, the intersection being denoted by 51. The radius of curvature of each arc 48 and 49 is equal to the horizontal spacing of the pin connection 38 from the intersection 51 so that when pin 38 is aligned with either center of curvature, roller 47 and hence arm 31 pivots about pin 38. The intersection 51 is rounded to provide a smooth transition from one arc 48 to the other 49. Summarizing the construction of the steering arm 31, the entire assembly may be considered a unit mechanism in the form of a linkage having pivot connections at 38 and 47 and a sliding connection at 40. When the steering arm 31 senses an angular displacement of the baler 11 relative to the wagon 14, initial pivotal movement of the arm 31 is about the axis of the roller 47. The roller 47, having its axis of rotation aligned with the pivotal axis of the bale thrower 10, is not free to follow either of the arcs 48, 49 since the pin 38 is not aligned with the center of curvature of either arc 48 or 49.

Pivotal movement of arm 31 about the roller 47 through the holding action of the pin 38 on bale thrower 10 maintains the direction of discharge thereof in alignment with the wagon 14. Thus, pivotal movement of the steering arm 31 relative to the baler 11 produces corresponding movement of the bale thrower 10 within the range described as the throwing scope. When sharp turns are encountered, the steering arm 31 forces the bale thrower to the extreme lateral position. In this position, pin 38 is aligned with the center of curvature of either arc 48 or 49. Further misalignment of the baler 11 relative to the wagon 14 forces the saddle 40 and hence end 39 outside the throwing scope. However, pivotal movement at the opposite end of the steering arm 31 is about the pin connection 38 since the arcs 48 or 49 no longer constrain lateral movement of roller 47. The movement of the steering arm 31 in the area outside the throwing scope is therefore seen to be relative to the bale thrower 10 and responsive to relative movement of the wagon tongue 26.

The operation of the steering arm will be described with reference to FIGURES 5, 6, and 7. Let it first be assumed that the baler 11, the bale thrower 10, and the wagon 14, arranged in tandem, are driven through the windrowed field in a straight line course. In this situation the bale thrower 10 is aimed directly rearwardly and the connecting linkages (the hitch 28 and tongue 26) and the steering arm 31 are in general vertical alignment.

Now let it be assumed that the baler 11 begins making a wide turn as depicted in FIGURE 6. The baler 11 assumes a given direction of travel which is oblique with the general direction of travel of the trailing wagon 14. The wagon tongue 26 pivots about the pin connection 29 and the rearward end 39 steering arm 31 slidingly follows the angular displacement of the tongue 26 relative to the direction of travel of the baler 11. The forward end 36 of the steering arm pivots about the axis of roller 47. The relative pivotal movement of the steering arm 31 about roller 47 is imparted to the bale thrower 10 through connection 38 thereby maintaining the proper alignment of the bale thrower 11 in relation to the wagon 14.

Next let it be assumed that the baler 10 makes a sharp turn wherein the angle between the tongue 26 and the hitch 28 approaches 90 degrees (see FIGURE 7). In this situation the bale thrower 10 has reached its swinging limit determined by the ring 23 engaging the side of the bale chamber 13 which in this embodiment is about 25° displaced from the home position. In this position of the bale thrower the pin connection 38 is coincident with the center of curvature of one of the arcs 48 or 49 of bracket 46. Further misalignment of the direction of travel of the baler 11 relative to the tongue 26 causes the steering arm 31 to pivot about connection 38 relative to the bale thrower 10, the roller 47 following the path of one of the arcs 48 or 49. When the baler 11 and wagon 14 resume a generally straight line direction of travel, the roller 47 returns to the intersection 51 and the bale thrower 10 becomes movably responsive to the steering arm 31.

What is claimed is:

1. A device for controlling the direction of discharge of bale thrower of the type swingably mounted at the rear of a baler, said bale thrower having a predetermined angular scope of swingability and adapted to traject bales to an associated wagon normally aligned with said baler, said device comprising:

a steering arm having a rear end, a forward end, and an intermediate portion;

means connecting said rear end to said wagon for imparting lateral movement to said rear end in response to relative angular displacement of said baler and said wagon;

first means providing an operative engagement of said forward end to said baler; and means hinging said intermediate portion to said bale thrower;

said first means including means for restraining lateral movement of said forward end for lateral movement of said rear end within said angular scope, said first means providing a pivot axis for said steering arm, said hinge connection providing a contact for swinging said bale thrower laterally in response to lateral movement of said rear end.

2. The device as recited in claim 1 wherein said first means includes means for releasing said restraining means whereby said forward end is free to swing laterally in response to lateral movement of said rear end, said releasing means being operative with said rear end positioned at either lateral extremity of said angular scope and, said hinge connection providing a pivot axis for said steering arm for lateral movement of said rear end beyond said lateral extremities.

3. The device as recited in claim 2 wherein said first means includes:

a roller mounted on said forward end for rotation about a vertical axis;

a bracket mounted on said baler, said bracket having formed therein an arcuate surface engageable with said roller, said arcuate surface configured to restrain lateral movement of said roller for lateral movement of said ear end within said angular scope of said bale thrower, and permitting lateral movement of said forward end for lateral movement of said rear end outside said angular scope of said bale thrower.

4. The device as recited in claim 3 wherein said arcuate surface is particularly configurated in the form of two intersecting circular sections, said roller adapted to normally engage said intersection, said circular sections restraining lateral movement of said roller, each of said circular sections having a center of curvature coincident with said hinge connection when said rear end occupies a position at the outer lateral boundary of said throwing scope.

5. A device for controlling the direction of discharge of bale thrower of the type mounted at the rear of a baler, and swingable relative thereto about a vertical axis, said bale thrower having a predetermined angular scope of swingability and adapted to traject bales to an associated wagon normally aligned with said baler, said device comprising:
- a steering arm having a forward end connected to said baler for providing a first pivot axis for said steering arm, an intermediate portion connected to said bale thrower for providing a second pivot axis for said steering arm, and a rear end connected to said wagon, said rear end being movable laterally in response to angular displacement of said wagon relative to said baler; and
- means for restraining lateral movement of said forward end for a predetermined angular displacement of said baler and said wagon, whereby said steering arm pivots about said first axis and said intermediate portion and said bale thrower swing about their respective axes in response to lateral movement of said rear end; and
- means for releasing said restaining means, said releasing means being responsive to angular displacement of said baler relative to said wagon beyond said predetermined angular displacement whereby said steering arm pivots about said second pivot axis.

6. The device as recited in claim 5:
wherein said first pivot axis and said vertical axis of said bale thrower are axially aligned.

7. A device for connecting a forwardly extending wagon tongue to a baler and a bale thrower swingably mounted on said baler, said device comprising:
- a steering arm having a rear end slidably engageable with said tongue and movable laterally therewith, a forward end having a roller mounted thereon, and an intermediate portion hingedly connected to said bale thrower; and
- means first for engaging said roller with said baler for providing a pivot axis for said steering arm, said first means operative for a predetermined angular displacement of said tongue relative to the direction of travel of said baler, said hinge connection providing means for swingingly moving said bale thrower about its axis in response to swinging movement of said arm about said pivot axis, said first means being inoperative for an angular displacement of said tongue relative to the direction of travel of said baler, beyond said predetermined angular displacement, said steering arm being movable relative to said bale thrower in said angular displacement beyond said predetermined angular displacement.

8. A device for controlling the throwing direction of a bale thrower mounted on a baler and adapted to cooperate with a trailing wagon, said wagon having a forwardly extending tongue attached to said baler and in normal alignment therewith, said bale thrower being mounted at the rear of said baler for swinging movement about a vertical axis, said device comprising:
- a steering arm having a forward portion, an intermediate portion and a rear portion;
- means for connecting said rear portion to said tongue, said rear portion being movable laterally relative to said baler in response to angular departure from said normal alignment of said tongue relative to said baler;
- means connecting said forward portion to said baler, said means providing a first steering arm pivot axis on said baler;
- means connecting said intermediate portion to said bale thrower, said means providing a second steering arm pivot axis on said bale thrower; and
- means for selectively causing said steering arm to pivot about one of said pivot axes in response to angular departure of said tongue relative to said normal alignment,
- said first pivot axis being operative within a predetermined angle of departure from said normal alignment whereby said steering arm imparts swinging movement to said bale thrower relative to said baler, said second pivot axis being operative for angular departure greater than said predetermined angle whereby said steering arm pivots relative to said bale thrower.

9. The device as recited in claim 8:
wherein said predetermined angle of departure is in the range of 20–30° on either side of said normal alignment.

References Cited

UNITED STATES PATENTS

| | | | |
|---|---|---|---|
| 3,263,833 | 8/1966 | Evans et al. | 214—42 |
| 3,326,394 | 6/1967 | May et al. | 214—42 |

ROBERT G. SHERIDAN, Primary Examiner